(12) United States Patent
Wilson

(10) Patent No.: US 6,496,571 B1
(45) Date of Patent: Dec. 17, 2002

(54) TELECOMMUNICATION SYSTEM, METHOD AND TELEPHONE WITH PERSONAL CALLER IDENTIFICATION CAPABILITY

(75) Inventor: Randall Joe Wilson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/141,996

(22) Filed: Aug. 28, 1998

(51) Int. Cl.[7] .............................................. H04M 11/00
(52) U.S. Cl. .............................. 379/93.23; 379/142.01; 379/93.03
(58) Field of Search .......................... 379/91.01, 91.02, 379/93.01–93.03, 93.05, 93.08, 93.12, 93.23–93.28, 88.02, 88.03, 142.01, 142.17

(56) References Cited

U.S. PATENT DOCUMENTS

| | | | |
|---|---|---|---|
| 5,297,183 A | * 3/1994 | Bareis et al. | 379/88.02 |
| 5,872,834 A | * 2/1999 | Teitelbaum | 379/93.03 |
| 6,088,585 A | * 7/2000 | Schmitt et al. | 379/93.03 |
| 6,219,793 B1 | * 4/2001 | Li et al. | |

FOREIGN PATENT DOCUMENTS

| | | | |
|---|---|---|---|
| GB | 2148569 | * | 5/1985 |
| JP | 62-188539 | * | 8/1987 |
| JP | 4-352548 | * | 12/1992 |
| JP | 5-342217 | * | 12/1993 |
| WO | 97/25691 | * | 7/1997 |

* cited by examiner

Primary Examiner—Wing Chan
(74) Attorney, Agent, or Firm—Grossman Patti & Brill (57) ABSTRACT

A telecommunication system obtains personal information from a caller to provide the identity of the caller to a called telephone. In one embodiment, fingerprint information of the caller is obtained from a fingerprint scanner at the calling telephone of the caller which is then correlated with names in a finger print information database to the identify the caller. In another embodiment, voiceprint information of the caller is obtained to identify the caller through use of a voiceprint information database that correlates the voiceprint information with voiceprint data in the voiceprint information database. In both embodiments, if a called telephone local switch determines that the called telephone is authorized to receive the identity of the caller, the called telephone local switch transmits the identity of the caller to the called telephone.

16 Claims, 10 Drawing Sheets

FIG. 4B
VOICE PRINT ID NETWORK SIGNALLING

TELECOMMUNICATION SYSTEM, METHOD AND TELEPHONE WITH PERSONAL CALLER IDENTIFICATION CAPABILITY

BACKGROUND OF THE INVENTION

This invention generally relates to a telecommunication system, method and telephone and more particularly to a telecommunication system, method and telephone with caller identification capability.

The proliferation of personal telecommunications has created a demand for features to enable a called party at a called telephone to avoid unwanted telephonic calls. Known call identification systems are based solely on automatic number identification of the telephone number of the caller that is provided to the called telephone during ringing and prior to answering of the call. In some of the identification systems, a directory listing name that is associated with the calling telephone is provided in lieu of the telephone number of the calling telephone and displayed at the called telephone on an alphanumeric display. Alternatively, the called telephone is programmed by the user to display a name preselected by the user of the called telephone in lieu of the telephone number of the calling telephone.

While the systems that display a personal name of a person give the appearance of providing personal identification of the caller, in fact, they do not unless the caller with that name is calling from a telephone having a telephone number associated with the name of the caller. If the caller calls from a another telephone another name associated with the other telephone is displayed. If someone other than the person whose name is associated with the calling telephone calls from the calling telephone of the named caller, then the name of the actual caller is not displayed; instead, the name of the person associated with the telephone number of the calling telephone is displayed.

The inventor has determined that existing caller identification systems are disadvantageously limited in their capabilities and thus are unreliable with respect to enabling the called party of the called telephone to predetermine the identity of the actual party placing the call from the identified calling telephone. With the existing telecommunication systems, methods and telephones with caller identification capability, the called party must assume but cannot know with any degree of certainty that the identity displayed is the identity of the caller actually placing the call.

Telephonic systems are also known that have a so-called voice dialing pursuant to which automated voice recognition are employed to enable a telephone to respond to voice commands from the user, particularly the digits of the telephone to be called, to place calls. These systems are designed to recognize the voice of any normal user in a large population of potential users.

SUMMARY OF THE INVENTION

In accordance with the present invention the aforementioned disadvantageous inability of known communication systems, methods and telephones with so-called identification capability to provide the identity of the actual caller irrespective of the identity of the caller are overcome by providing a telecommunication system and method in which the actual identity of the person calling is ascertained and by providing a telephone in which personal identifying information concerning a caller is automatically obtained and transmitted.

An embodiment of a telecommunication system of the present invention has means for automatically obtaining personal information concerning a caller during placement of a call to a called telephone and means responsive to the personal information automatically obtained for personally identifying the caller. Preferably, the automatically obtaining means includes one of means for obtaining fingerprint information from the caller and means for obtaining voiceprint information from the caller. In the case of obtaining fingerprint information, a fingerprint scanner associated with at least one of the keys of the keypad is used for automatically obtaining fingerprint information from the caller. In the case of obtaining voiceprint information, a telephone microphone converts the voice of the caller to electrical audio signals and the automatically obtaining means responds to the electrical audio signals to produce corresponding voiceprint information associated with the caller. The fingerprint information is transmitted to a fingerprint database and the voiceprint information is transmitted to a voiceprint database. The fingerprint information is compared with fingerprint data in the fingerprint database to personally identify the caller associated with the fingerprint information. The voiceprint information is compared with voiceprint data in a voiceprint database to personally identify the caller associated with the voiceprint information. Preferably, a local switch servicing the called telephone includes at least one of the fingerprint database and the voiceprint database.

Preferably, the telecommunication system includes means for providing to the called telephone an identity of a telephone of a caller and means responsive to a determination that the at least one of the fingerprint information and the voiceprint information is not associated with a known personal identity for actuating the caller telephone identity providing means. Likewise, the telecommunication system of the present invention includes means for detecting if the called telephone is authorized to receive the identity of the caller, and means responsive to the detecting means for providing the identity of the caller to the called telephone if authorized.

In keeping with another aspect of the present invention, a telephone is provided having means for automatically obtaining personal identifying information concerning a caller using the telephone and means for automatically transmitting the personal identifying information of the caller to a telephonic switch during placement of a call by the caller. Preferably, a fingerprint scanner associated with a scanable finger pad scans a fingerprint of a finger of the caller pressed against the scanable finger pad, and the finger pad is associated with one of the keys of the keypad used for the placement of the call.

In accordance with the telecommunication method of the present invention, the personal identity of a caller is automatically ascertained at a calling telephone during initiation of a call to a called telephone and the personal identity is automatically provided to the called telephone prior to the call being answered at the called telephone.

BRIEF DESCRIPTION OF THE DRAWINGS

The foregoing advantageous features of the present invention will be explained in greater detail and others will be made apparent from the detailed description of the preferred embodiment of the telecommunication system, method and telephone of the invention that is given with reference to the several figures of the drawing, in which.

DETAILED DESCRIPTION

Figure 1:
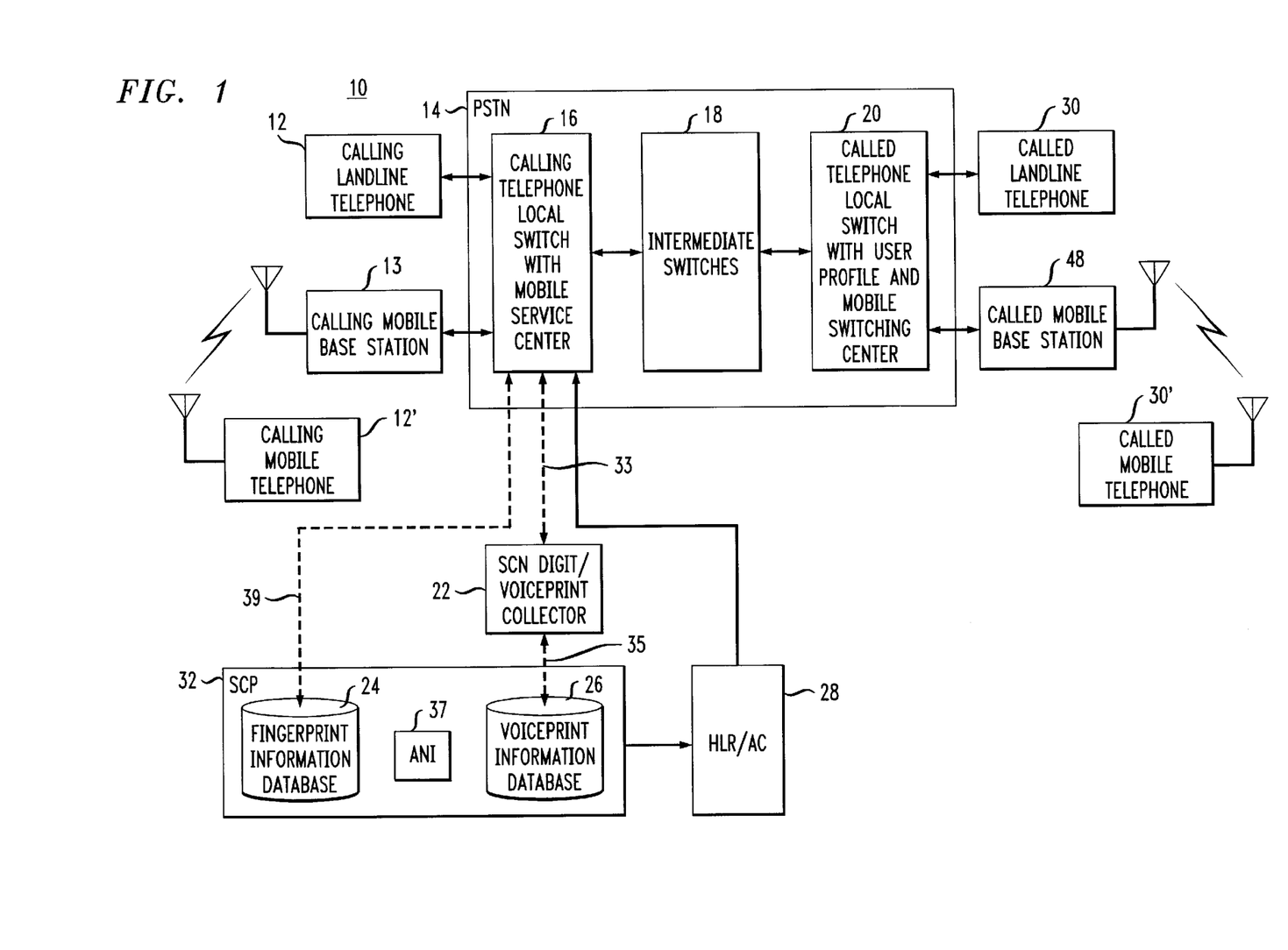
FIG. 1 is a functional block diagram of an embodiment of the telecommunication system of the present invention.

Referring to FIG. 1, one embodiment of the telecommunication system 10 of the present invention is seen to be implemented in an existing public switched telephone network, or PSTN, 14 which includes a plurality of interconnected telephonic switches, only some of which are illustrated for purposes of describing the telecommunication system 10. One of these central office telephonic switches is a central office switch directly linked to and providing local service to a calling telephone and is therefore referred to herein as the calling telephone local switch 16. In the case of a calling landline telephone 12, the link is a direct landline connection between the calling landline telephone 12 and the calling telephone local switch 16. In the case of a calling mobile telephone 12', the calling telephone local switch 16 has an associated calling mobile switching center connected through landline connections with at least one mobile base station 13 for establishing an airwave communication link with the calling mobile telephone 12'.

In the case of a roaming calling mobile telephone 12', a communication link is established between another mobile base station of another mobile switching center (not shown) within the cellular territory of which the calling mobile telephone 12' has roamed. However, this other mobile switching center should be considered to be the same as the calling telephone local switch 16 for purposes of identification of the caller as discussed below.

One of the plurality of central office switches of the PSTN 14 is one linked with a called telephone 30 of the system and is therefore referred to here as the called telephone local switch 20. In the case of a called landline telephone 30, the link is a direct landline connection between the called landline telephone 12 and the called telephone local switch 20. In the case of the called telephone being a called mobile telephone 30', the called telephone local switch 20 has an associated mobile switching center connected with a called mobile base station 48 for establishing a radio communication link with the called mobile telephone 30'.

In the general case, the calling telephone local switch 16 and the called telephone local switch 20 are not the same switch and are interconnected through a plurality of intermediate switches 18. Likewise, the calling telephone local switch 16 and the called telephone local switch 20 having associated mobile switching centers is a general case, and when neither the called telephone nor the calling telephones are mobile telephones the mobile switching centers are of course not needed. For purposes of simplicity, the explanation of the system of the invention is given with reference to the called telephone and the calling telephone being the landline telephones 30 and 12. It should be understood that the communication and steps that are performed with respect to establishing the personal identity of the caller when mobile telephones 30' and 12' are used is substantially the same as described here with reference to the landline telephones 30 and 12 except for differences in signaling needed for mobile communication. In the case of a calling mobile telephone 12', the mobile service center of the calling telephone local switch 16 and the service control point, or SCP, 32 are interconnected through a home location register/authentication center, or HLR/AC, 28 preferably via communication links following ANSI communication protocol. The invention is also applicable to alternative signaling formats such as those based on the TIA standards, the ETSI standards, the ARIB standards in Japan, and standards used in Korea and South America.

In accordance with one aspect of the invention, the personal information that is automatically obtained from the caller at the calling telephone includes the individual voice harmonic characteristics of the caller at the calling telephone, and in such case, any telephone is capable of functioning as the calling telephone 12 and the calling telephone 12 need not be a special telephone constructed in accordance with the invention and as described below with respect to FIG. 2. In such case, after the caller at the calling telephone 12 dials a special access code, the service circuit node, or SCN, 22 of the calling telephone local switch 16 has special software that operates in accordance with the invention and is described below with reference to the logic flow charts of FIGS. 3A and 3E that is activated by the access code to extract voiceprint identification from the voice of the caller. Preferably, the voiceprint identification activation is associated with access to a voice dialing feature in which case the access code for voiceprint identification is the same as that for access to the voice dialing feature. In such event, the voiceprint information is obtained from the voice of the caller while speaking the digits by the personal identification system of the present invention while the SCN 22 operates to discern and collect the telephone digits or numbers being spoken to place the call to the called telephone 30.

Alternatively, the caller is prompted to speak a sufficient number of words other than the telephone number of the called telephone 30 to enable production of adequate voiceprint information to enable identification of the caller. In any event, the SCN 22 collects the voiceprint information and passes the voiceprint information to a voiceprint information database 26 of the present invention that is preferably located at the SCP 32 of the calling telephone local switch 16. The communication link 33 between the calling telephone local switch 16 and the SCN 22 is preferably established in accordance with an intelligent network application part, or INAP, protocol. The communication link 35 between the SCN 22 and the SCP 32 is preferably established in accordance with an ANSI-41 protocol. Alternatively, the protocol is the INAP protocol.

A special search program of the present invention is described below with reference to the logic flow chart of FIG. 3E and searches the voiceprint information database 26. If an identification is ascertained, then the personal identity of the caller is sent by the SCP 32 back to the SCN 22.

Preferably, the SCP 32 also has an automatic number identification system, or ANI system, 37, and if the personal identity of the caller cannot be ascertained from the voiceprint information received from the SCN 22, then the SCP 32 sends the number of the calling telephone 12 in lieu of the personal identity of the caller. Alternatively, if a directory listing name is associated with the calling telephone 12, then the directory listing name is sent in lieu of the number of the calling telephone 12, but in such case an indication is also provided that the name is only the name associated with the calling telephone 12 and not necessarily the name of the person actually calling that has been ascertained from personal information concerning the caller, themselves.

In accordance with another aspect of the invention, the personal information concerning the caller at the calling telephone 12 is the fingerprint of the caller. When fingerprint information is used in accordance with the invention, the calling telephone 12 must be a special fingerprint scanning telephone of the invention, as described below with respect to FIG. 2. In that event, fingerprint information is sent from a fingerprint scanner 38 at the calling telephone 12 to the calling telephone local switch 16. Then the calling telephone switch 16 sends the fingerprint information to a fingerprint information database 24 at the SCP 32 with a request for the name of the caller that corresponds to the fingerprint information being sent. The SCP 32 searches the fingerprint information database 24 for a match and if one is found, the SCP 32 delivers the corresponding name of the caller to the calling telephone local switch 16 which, in turn, passes the name to the called telephone local switch 20. The called telephone local switch 20 has a user profile that indicates whether the called telephone 30 is authorized to receive the name of the caller. If the user file indicates that the called telephone 30 is entitled to receive the name of the caller then the name is passed to the called telephone 30 for display prior to the called party answering the called telephone 30. If the name of the caller cannot be ascertained from the fingerprint information, then the number of the calling telephone 12 or the name associated with the calling telephone 12 is sent to the called telephone 30. The communication link 39 between the calling telephone local switch 16 and the SCP 32 and the fingerprint information database 24 follows an ANSI-41 communication protocol. Alternatively, an INAP communication protocol is employed.

To determine the identity of the caller, the telecommunication system 10 obtains personal information about the caller from the calling telephone 12.

Figure 2:
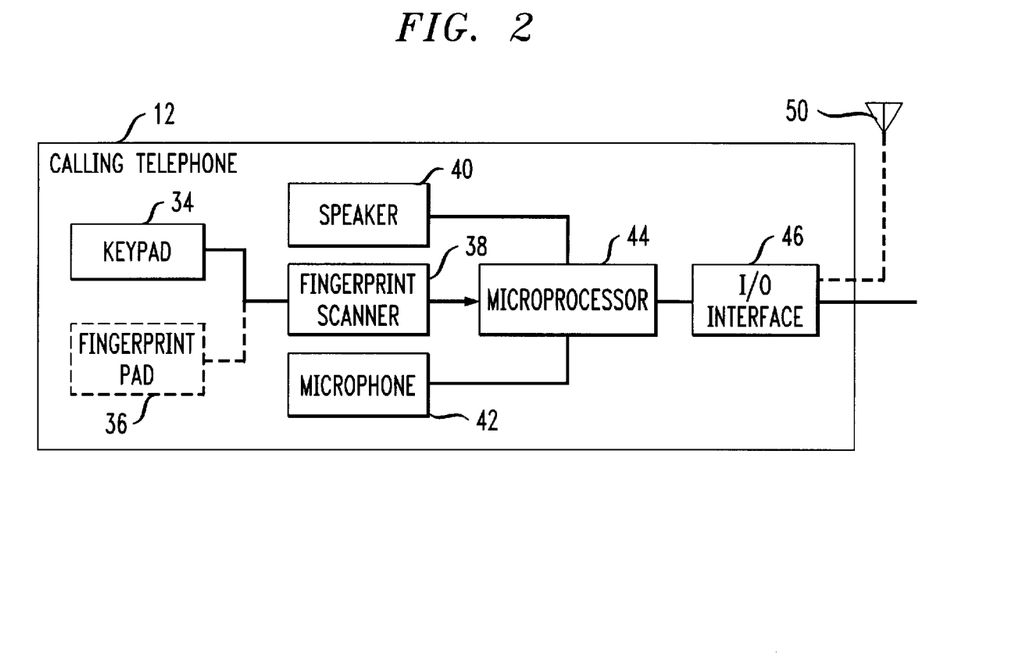
FIG. 2 is a functional block diagram of one embodiment of the telephone of the present invention shown as single landline and mobile telephone blocks in FIG. 1.
Figure 3A:
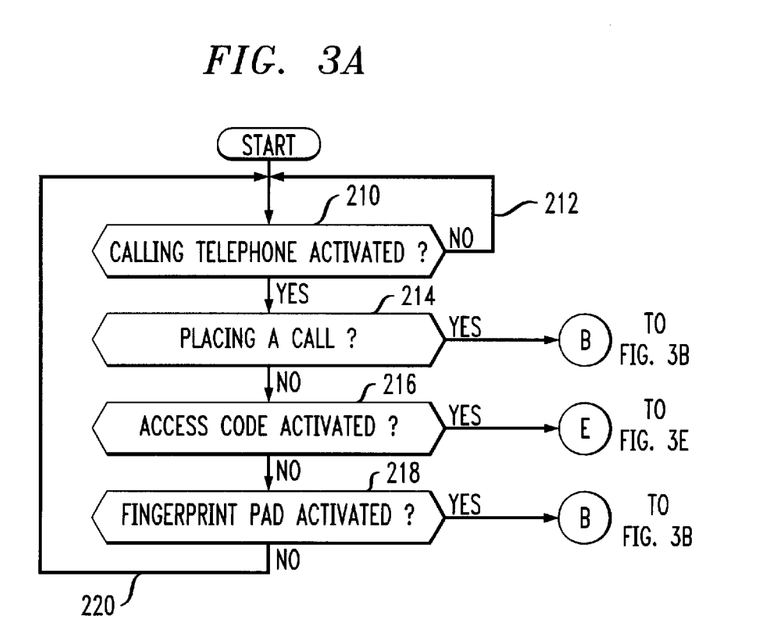
FIGS. 3A–3G form a composite logic flowchart of a preferred implementation of the telecommunication method of the invention.
Figure 3B:
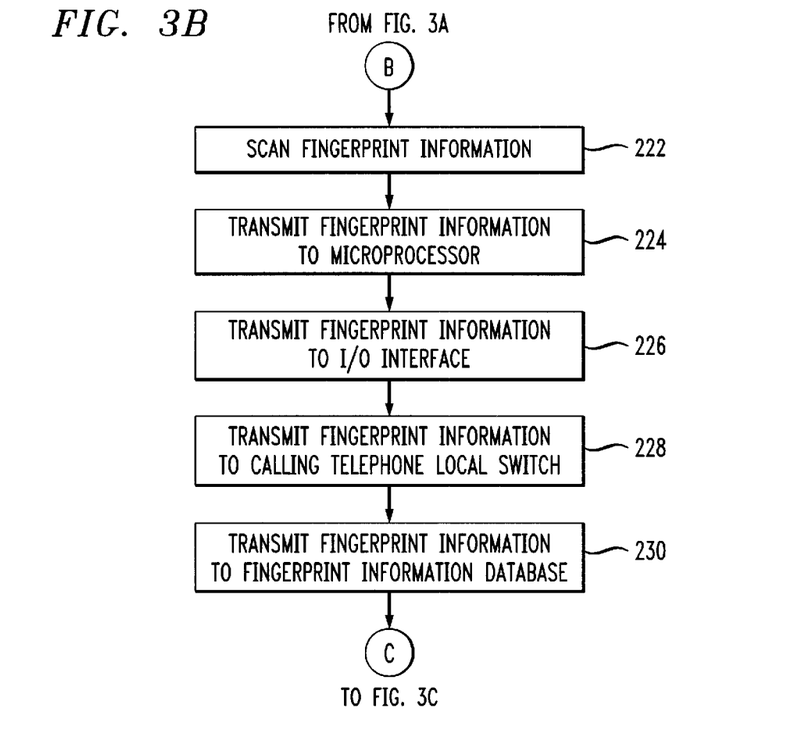

As seen in FIG. 2, a calling telephone 12 obtains personal information from the caller. The calling telephone 12 has a keypad 34. The caller uses the keypad 34 to dial the telephone number of the called telephone 30. The calling telephone 12 also has a fingerprint scanner 38. The fingerprint scanner 38 scans the fingerprint information of a caller. The calling telephone 12 also has a microprocessor 44 that receives the fingerprint information from the fingerprint scanner 38. The calling telephone 12 also has a speaker 40. Also, the calling telephone 12 has a microphone 42 that transmits the voice of the caller to the microprocessor 44. The calling telephone 12 also has an input/output, or I/O, interface 46 that receives the fingerprint and voiceprint information from the microprocessor 44. The I/O interface 46 enables transmission of communications between the calling telephone 12 and a telephone network. If the calling telephone is the calling mobile telephone 12', then the I/O interface 46 transmits communications to an antennae 50 to enable communication with the telephone network.

Alternatively, a fingerprint pad 36 obtains the personal information of the caller. The caller places a finger on the fingerprint pad 36, and the fingerprint scanner 38 scans the fingerprint information of the caller.

FIGS. 3A–3G form a composite logic flowchart of a telecommunication method for practice in accordance with the invention. The composite logic flowchart describes the processing steps for determining the identity of the caller and transmitting the identity of the caller to the called telephone 30. In step 210, FIG. 3A, the calling telephone 12 determines whether the calling telephone 12 is activated. If the calling telephone 12 is not activated, then in step 212, FIG. 3A, the step 210, FIG. 3A, repeats until the calling telephone 12 is activated.

Referring again to step 210, FIG. 3A, if the calling telephone 12 is activated then in step 214, FIG. 3A, the calling telephone 12 determines whether the caller is placing a call to a called telephone 30. If the caller is placing a call, then in step 222, FIG. 3B, the fingerprint scanner 38 associates with a plurality of keys on the keypad 34 to scan the fingerprint information of the caller from at least one of the keys on the keypad 34. In step 224, FIG. 3B, the fingerprint scanner 38 transmits the fingerprint information to the microprocessor 44. In step 226, FIG. 3B the microprocessor 44 transmits the fingerprint information to the I/O interface 46. In step 228, FIG. 3B, the I/O interface 46 transmits the fingerprint information to the calling telephone local switch 16 of the PSTN 14. In step 230, FIG. 3B, the calling telephone local switch 16 transmits the fingerprint information via the communication link 39 to the fingerprint information database 24 of the SCP 32.

Figure 3C:
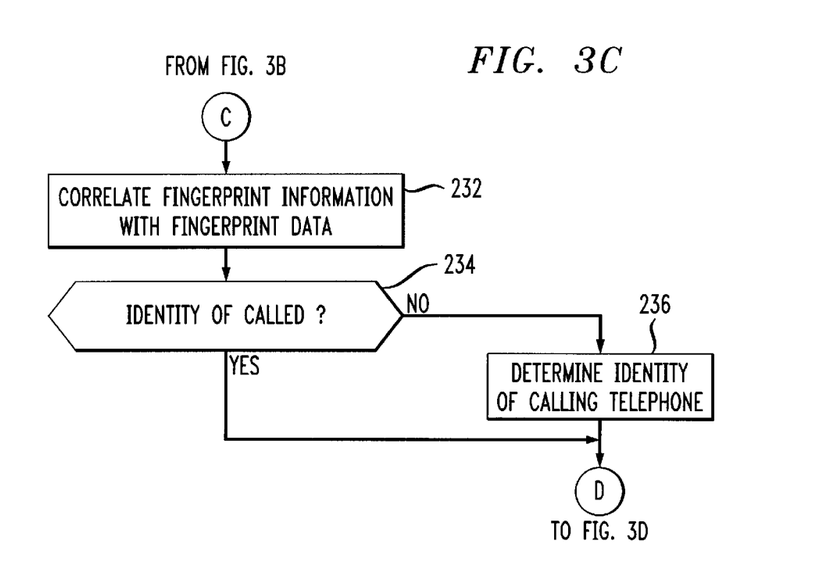
Figure 3D:
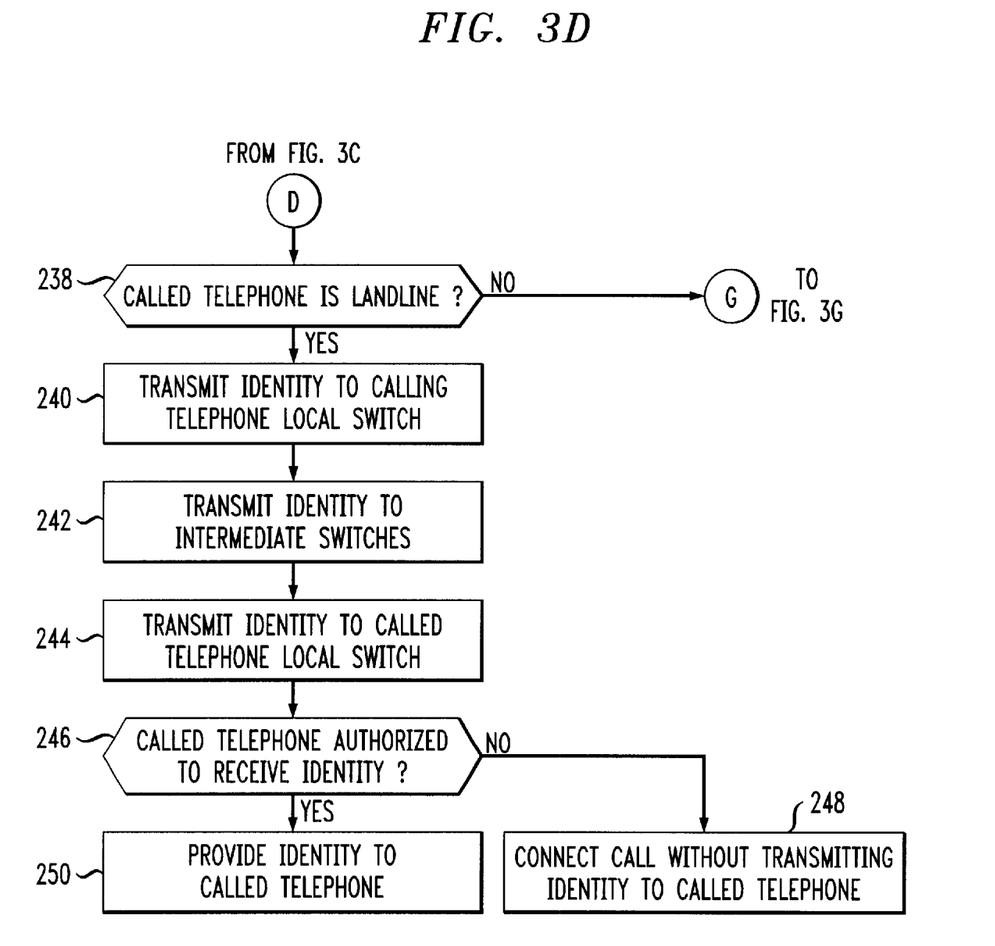

In step 232, FIG. 3C, the fingerprint information database 24 correlates the fingerprint information with the fingerprint data of the fingerprint information database 24. In step 234, FIG. 3C, the fingerprint information database 24 determines the identity of the caller. If the fingerprint information database 24 is not able to determine the identity of the caller in step 234, FIG. 3C, then in step 236, FIG. 3C, the fingerprint information database 24 determines the identity associated with the calling telephone 12.

After determination of an identity in at least one of step 234, FIG. 3C and step 236, FIG. 3C, the telecommunication system 10 transmits the identity of the caller to the called telephone. In step 238, FIG. 3D, the fingerprint information database 24 determines whether the called telephone is at least one of the called landline telephone 30 and the called mobile telephone 30'. If the called telephone is the called landline telephone 30, then in step 240, FIG. 3D, the fingerprint information database 24 transmits the identity of the caller to the calling telephone local switch 16. In step 242, FIG. 3D, the calling telephone local switch 16 transmits the identity of the caller to the intermediate switches 18. In step 244, FIG. 3D, the intermediate switches transmit the identity of the caller to the called telephone local switch 20. In step 246, FIG. 3D, the called telephone local switch 20 determines whether the called landline telephone 30 is authorized to receive the identity of the caller. If the called landline telephone 30 is authorized, then in step 250, FIG. 3D, the called telephone local switch 20 transmits the identity of the caller to the called landline telephone 30. Referring back to step 246, FIG. 3D, if the called landline telephone 30 is not authorized to receive the identity of the caller then in step 246, FIG. 3D, the called telephone local switch 20 connects the telephone call to the called landline telephone 30 without transmitting the identity of the caller.

Figure 3E:
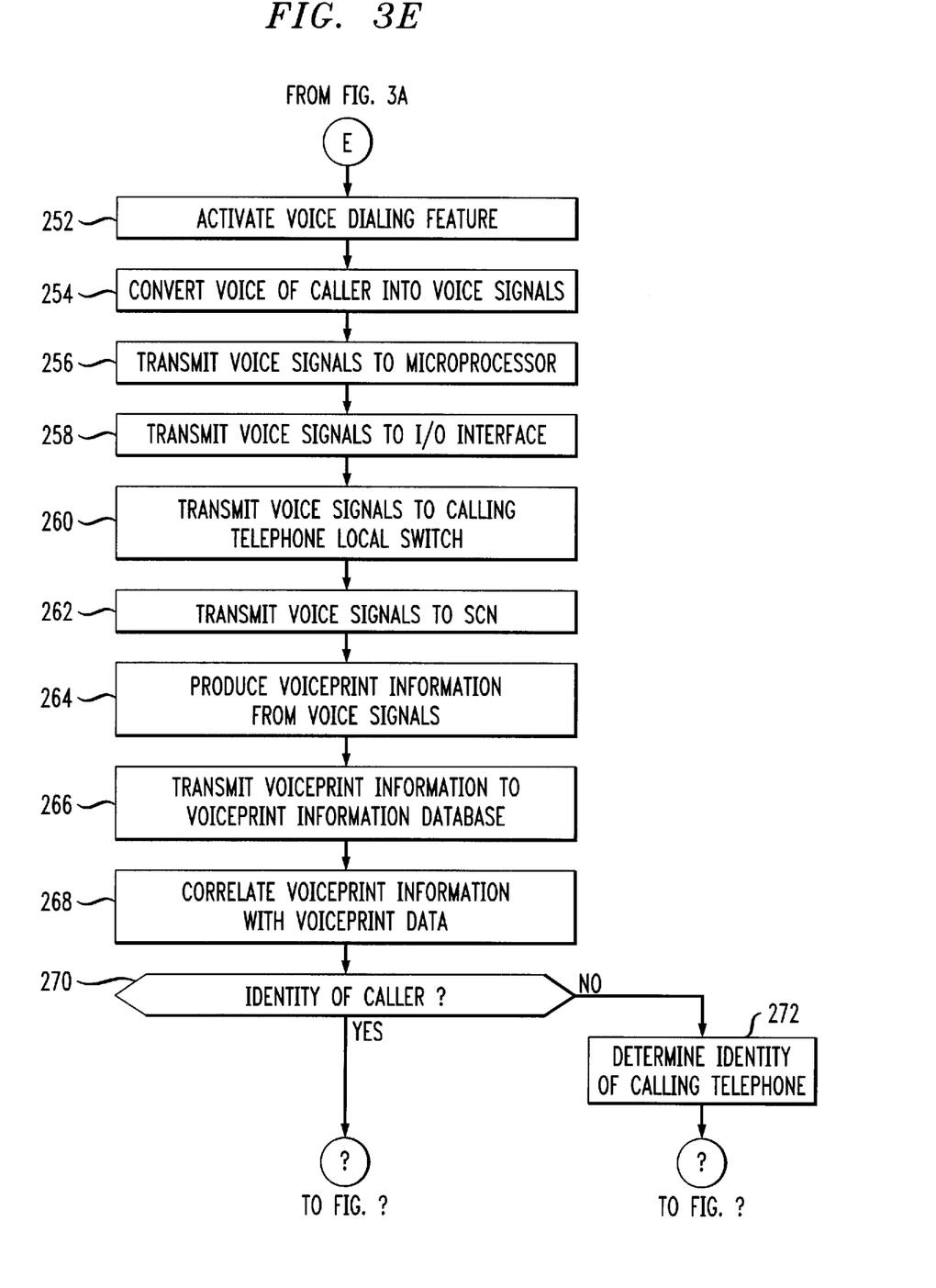
Figure 3F:
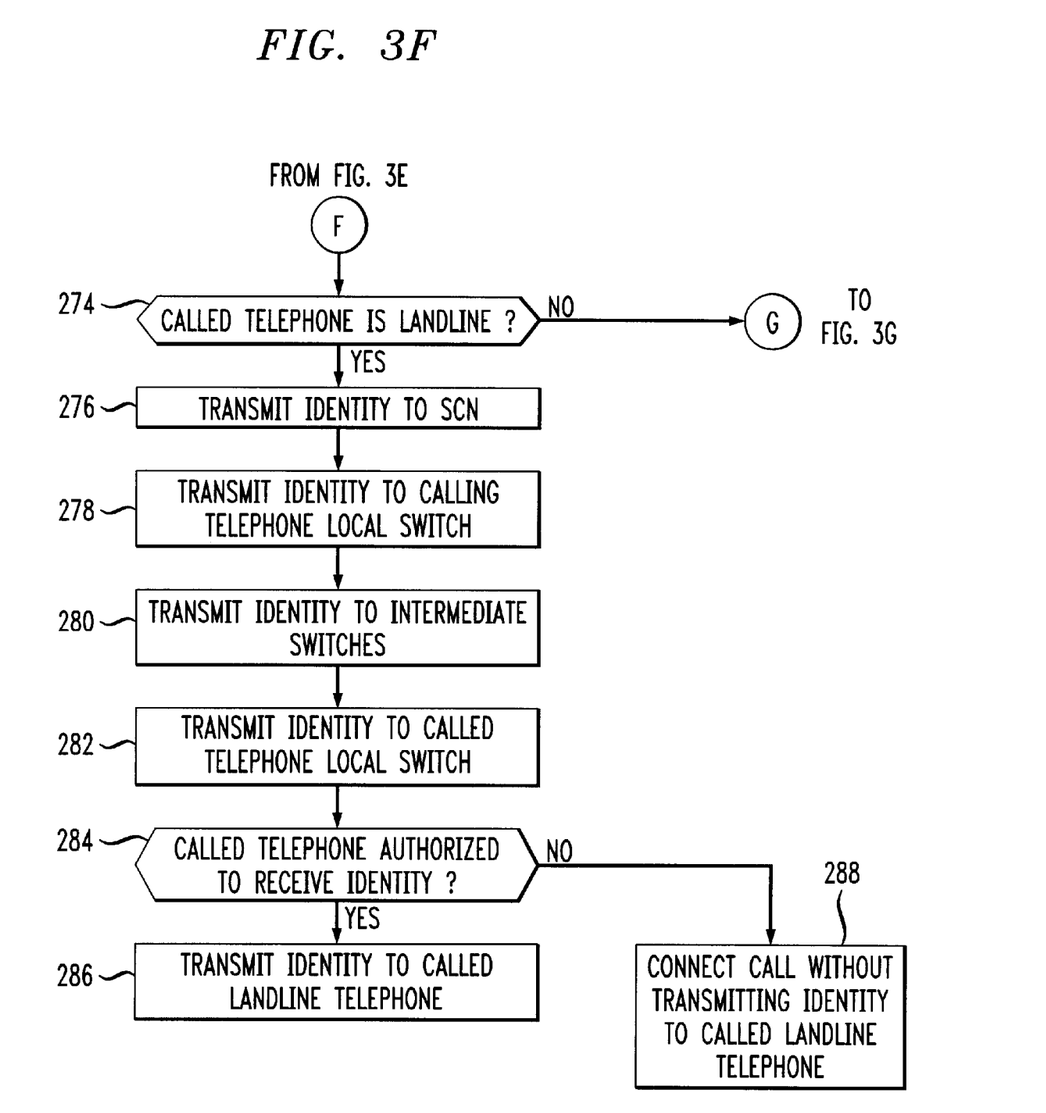
Figure 3G:
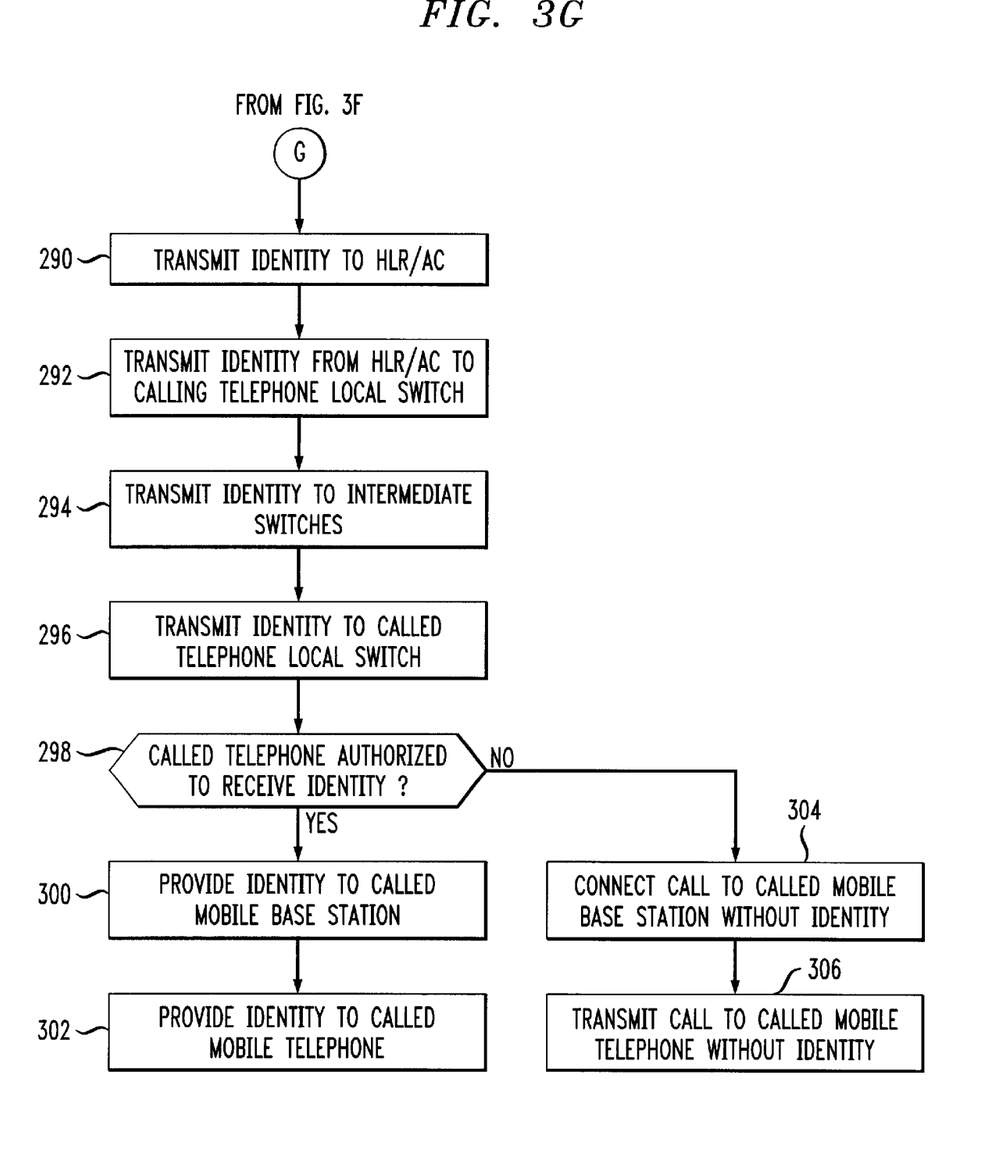

Referring back to step 238, FIG. 3D, if the fingerprint information database 24 of the SCP 32 determines that the called telephone is the called mobile telephone 30', then in step 290, FIG. 3G, the fingerprint information database 24 transmits the identity of the caller to the HLR/AC 28. In step 292, FIG. 3G, the HLR/AC 28 transmits the identity of the caller to the calling telephone local switch 16. In step 294, FIG. 3G, the calling telephone local switch 16 transmits the identity of the caller to the intermediate switches 18. In step 296, FIG. 3G, the intermediate switches transmit the identity of the caller to the called telephone local switch 20. In step 298, FIG. 3G, the called telephone local switch 20 determines whether the called mobile telephone 30' is authorized to receive the identity of the caller. If the called mobile telephone 30' is authorized, then in step 300, FIG. 3G, the called telephone local switch 20 provides the called mobile base station 48 with the identity of the caller. In step 302, FIG. 3G, the called mobile base station 48 transmits the telephone call while providing the called mobile telephone 30' with the identity of the caller. Referring back to step 298, FIG. 3G, if the called telephone local switch 20 determines that the called mobile telephone 30' is not authorized to receive the identity of the caller, then in step 304, FIG. 3G, the called local telephone switch 20 connects the telephone call to the called mobile base station 48 without providing the identity of the caller. In step 306, FIG. 3G, the called mobile base station 48 transmits the telephone call to the called mobile telephone 30' without providing the identity of the caller.

Referring back to step 214, FIG. 3A, if the caller is not placing a call, then in step 216, FIG. 3A, the calling telephone 12 determines whether the caller has activated an access code. If the access code is activated, then in step 252, FIG. 3E, the calling telephone 12 activates the voice dialing feature. In step 254, FIG. 3E, the microphone 42 converts the voice of the caller into voice signals as the caller vocally enters the telephone number of the called telephone. In step 256, FIG. 3E, the microphone 42 transmits the voice signals to the microprocessor 44. In step 258, FIG. 3E, the microprocessor 44 transmits the voice signals to the I/O interface 46. In step 260, FIG. 3E, the I/O interface 46 transmits the voice signals to the calling telephone local switch 16 of the PSTN 14. In step 262, FIG. 3E, the calling telephone local switch 16 transmits the voice signals to the SCN 22.

In step 264, FIG. 3E, the SCN 22 produces the voiceprint information from the voice signals. In step 266, FIG. 3E, the SCN 22 transmits the voiceprint information to the voiceprint information database 26 of the SCP 32. In step 268, FIG. 3E, the voiceprint information database 26 correlates the voiceprint information with voiceprint data in the voiceprint information database 26. In step 270, FIG. 3E, the voiceprint information database 26 determines the identity of the caller. If the voiceprint information database 26 is not able to determine the identity of the caller in step 270, FIG. 3E, then in step 272, FIG. 3E, the voiceprint information database 26 determines the identity associated with the calling telephone 12.

After determination of an identity in at least one of step 270, FIG. 3E and step 272, FIG. 3E, the telecommunication system 10 transmits the identity of the caller to the called telephone. In step 274, FIG. 3F, the voiceprint information database 26 determines whether the called telephone is the called landline telephone 30. If the called telephone is the called landline telephone 30, then in step 276, FIG. 3F, the voiceprint information database 26 transmits the identity of the caller to the SCN 22. In step 278, FIG. 3F, the SCN 22 transmits the identity of the caller to the calling telephone local switch 16. In step 280, FIG. 3F, the calling telephone local switch 16 transmits the identity of the caller to the intermediate switches 18. In step 282, FIG. 3F, the intermediate switches 18 transmit the identity of the caller to the called telephone local switch 20. In step 284, FIG. 3F, the called telephone local switch 20 determines whether the called landline telephone 30 is authorized to receive the identity of the caller. If the called landline telephone 30 is authorized, then in step 286, FIG. 3F, the called telephone local switch 20 transmits the identity of the caller to the called landline telephone 30. Referring back to step 284, FIG. 3F, if the called landline telephone 30 is not authorized, then in step 288, FIG. 3F, the called telephone local switch 20 connects the telephone call to the called landline telephone 30 without transmitting the identity of the caller.

Referring back to step 274, FIG. 3F, if the voiceprint information database 26 of the SCP 32 determines that the called telephone is the called mobile telephone 30', then in step 290, FIG. 3G, the voiceprint information database 26 transmits the identity of the caller to the HLR/AC 28. In step 292, FIG. 3G, the HLR/AC 28 transmits the identity of the caller to the calling telephone local switch 16. In step 294, FIG. 3G, the calling telephone local switch 16 transmits the identity of the caller to the intermediate switches 18. In step 296, FIG. 3G, the intermediate switches transmit the identity of the caller to the called telephone local switch 20. In step 298, FIG. 3G, the called telephone local switch 20 determines whether the called mobile telephone 30' is authorized to receive the identity of the caller. If the called mobile telephone 30' is authorized, then in step 300, FIG. 3G, the called telephone local switch 20 provides the called mobile base station 48 with the identity of the caller. In step 302, FIG. 3G, the called mobile base station 48 transmits the telephone call while providing the called mobile telephone 30' with the identity of the caller.

Referring back to step 298, FIG. 3G, if the called telephone local switch 20 determines that the called mobile telephone 30' is not authorized to receive the identity of the caller, then in step 304, FIG. 3G, the called local telephone switch 20 connects the telephone call to the called mobile base station 48 without providing the identity of the caller. In step 306, FIG. 3G, the called mobile base station 48 transmits the telephone call to the called mobile telephone 30' without providing the identity of the caller.

Referring back to step 216, FIG. 3A, if the calling telephone 12 determines that the access code is not activated, then the calling telephone 12 determines whether an alternative method for scanning the fingerprint information of the caller is activated. In step 218, FIG. 3A, the calling telephone 12 determines whether the fingerprint pad 36 is activated. If the fingerprint pad 36 is activated, then in step 222, FIG. 3B, the fingerprint scanner 38 scans fingerprint information from the calling telephone 12. After the fingerprint scanner 38 scans the fingerprint information, the process continues from the previously mentioned step 224, FIG. 3B.

However, referring back to step 218, FIG. 3A, if the calling telephone 12 determines that the caller has not activated the fingerprint pad 36 then in step 220, FIG. 3A, the process returns to step 210, FIG. 3A.

Figure 4A:
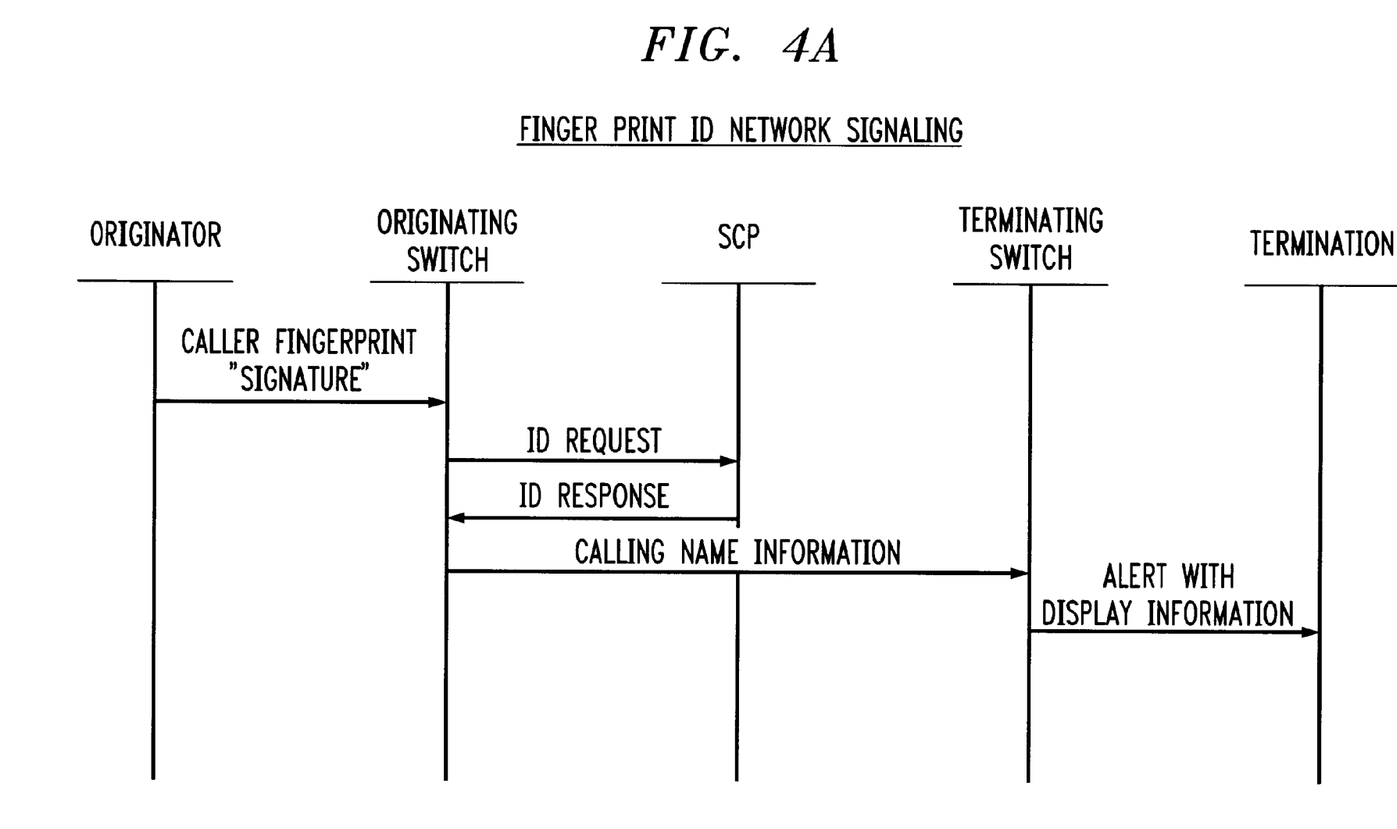
FIG. 4A is a logic flowchart of the preferred form of the finger print ID of the network signaling required for communication of the personal identification information between the various elements of the system.

FIG. 4A shows a flowchart of the fingerprint ID network signaling. At the originator, a fingerprint signature is captured and forwarded to the originating switch upon call origination. The originating switch requests an ID request from the intelligent network SCP. The signature is mapped against the name that is associated with it in the database. The SCP then responds with that information back to the originating switch. The originating switch routes to the terminating switch through normal routing procedures and provides the calling name information to the terminating switch. The terminating switch alerts the terminating device with display information.

Figure 4B:
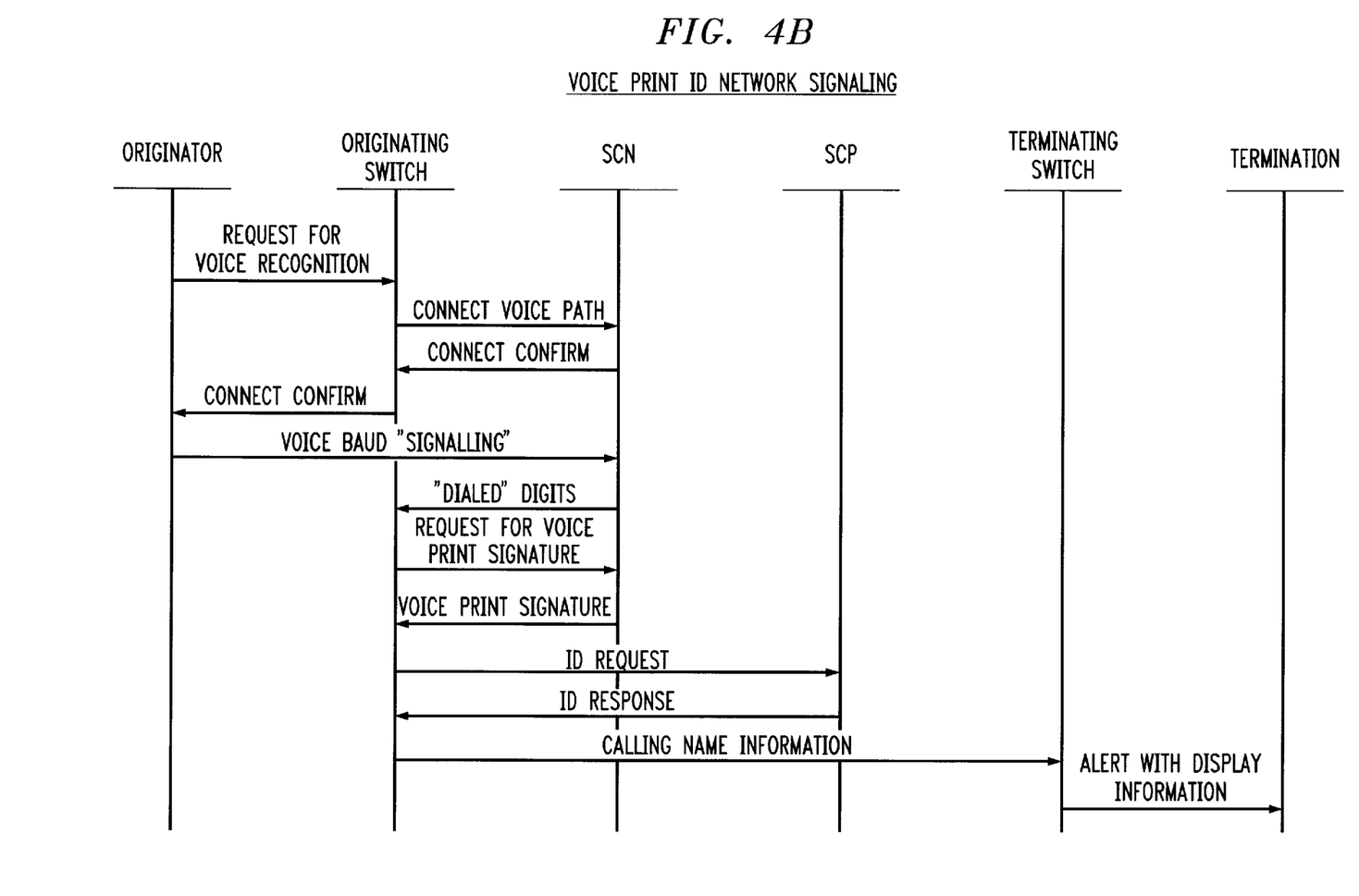
FIG. 4B is a logic flowchart of the preferred form of the voice print ID of the network signaling required for communication of the personal identification information between the various elements of the system.

FIG. 4B shows a flowchart of the voiceprint ID network signaling. At the originator line there is a hot button or direct connect button that connects the caller to voice recognition. The originating switch then provides a voice connectivity path to a service circuit known in the IN network. The service circuit node, SCN, provides confirmation that the voice path has connected and the originator gets a feedback signal that it is recognized. The originator then does voice band signaling, that is, speaks the numbers that they are trying to dial and route. The SCN returns the dialed digits that its captured to the originating switch. The originating switch would then request voice print signature from the SCN and then return a voice print signature back to the originating switch based upon that voice print signature. The originating switch requests from the SCP the name that is associated in the database with that voice signature. The process returns to the originating switch with a response of the name associated with that voice print. The originating switch routes to the terminating switch through normal routing procedures and provides the calling name information to the terminating switch.

Figure 5A:
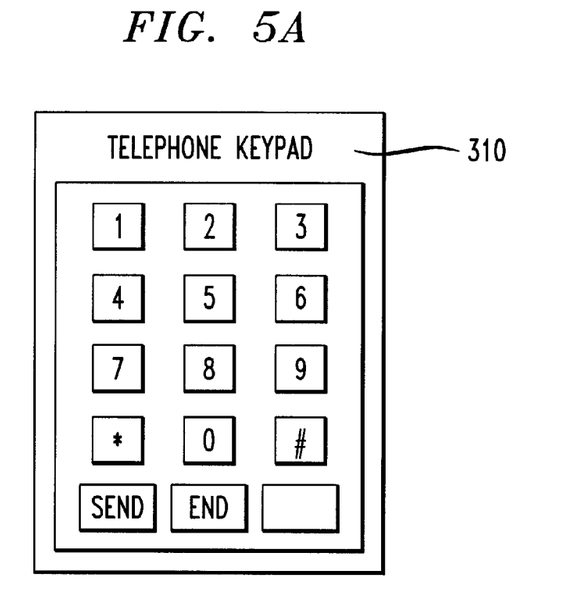
FIG. 5A is telephone keypad for use in accordance with the invention.
Figure 5B:
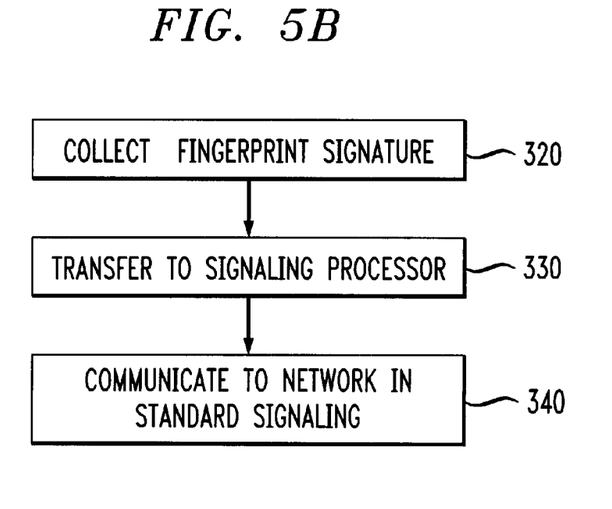
FIG. 5B is a flowchart of the operation of the fingerprint scanner of FIG. 2 used with the telephone keypad of FIG. 5A.

In the method of both FIGS. 5A and 5B, the completion of the methods is subject to service constraints initiated by subscribers involved in the call.

Referring now to FIG. 5A, a telephone keypad 310 is shown for use in accordance with the invention. In one embodiment, one or more and preferably all numbered translucent keys have a fingerprint signature integrated circuit (IC) located under each translucent key. Providing for each key to be so arranged insures that the caller identification procedure will be initiated during any out going call. In another embodiment, such as in mobile/wireless phones, only the send or end key needs to have an associated fingerprint signature IC. In another embodiment, land line or mobile/wireless phones have a dedicated key 315 of the keypad 310 associated with a fingerprint signature IC.

FIG. 5B is a flowchart showing the use of the keypad in accordance with the invention. At step 320, the collection of the fingerprint signature is obtained by depressing any key equipped with the fingerprint signature IC to collect the minutia data. At step 330, the minutia data is transferred in the phone to the signaling processor. In step 340, the signaling processor communicates data to the network.

While a detailed description of the preferred embodiments of the present invention has been given, there are many variations that remain within the scope of the present invention as defined by the appended claims.

What is claimed is:

1. A telecommunication system, comprising:
   means for automatically obtaining personal information concerning a caller during placement of a call to a called telephone;
   the automatically obtaining means includes means for obtaining fingerprint information from the caller and means for obtaining voiceprint information from the caller; and
   means responsive to the personal information automatically obtained for personally identifying the caller on an alpha-numeric display of the called telephone, means for providing an identity of a telephone of a caller to the called telephone, and means responsive to a determination that the at least one of fingerprint information and voiceprint information is not associated with a known personal identity for actuating the telephone identity providing means.

2. The telecommunication system of claim 1 including
   a telephone having a keypad with a plurality of keys, and in which
   the means for obtaining fingerprint information from the caller includes a fingerprint scanner associated with at least one of the keys of the keypad.

3. The telecommunication system of claim 1 including
   a telephone with a microphone for converting the voice of a caller to electrical audio signals, and in which
   the means for obtaining voiceprint information from the caller includes means responsive to the electrical audio signals for producing corresponding voiceprint information associated with the caller.

4. The telecommunication system of claim 3 including
   a telephone having a keypad with a plurality of keys, and in which
   the automatically obtaining means includes a fingerprint scanner associated with at least one of the keys of the keypad for obtaining fingerprint information from the caller.

5. The telecommunication system of claim 4 in which
   the telephone has means for generating an access code, and
   the voiceprint information producing means is responsive to the access code to produce the voiceprint information.

6. The telecommunication system of claim 5 including
   a service circuit node with a voice dialing capability, and in which
   the access code activates the voice dialing capability.

7. The telecommunication system of claim 1 in which the personal information responsive means includes
   means for transmitting fingerprint information to a fingerprint information database having fingerprint information of a plurality of subscribing callers, and
   means for transmitting voiceprint information to a digital voiceprint information database having voiceprint information of a plurality of subscribing callers.

8. The telecommunication system of claim 7 including means for associating the fingerprint information with fingerprint data in the fingerprint information database to personally identify the caller associated with the fingerprint information.

9. The telecommunication system of claim 7 including means for associating the voiceprint information with voiceprint data in the voiceprint information database to personally identify the caller associated with the voiceprint information.

10. The telecommunication system of claim 7 in which the system includes a local switch for servicing the called telephone that includes at least one of the fingerprint information database and the voiceprint information database.

11. The telecommunication system of claim 1 including
    means for detecting if the called telephone is authorized to receive the identity of the caller, and
    means responsive to the detecting means for providing the identity of the caller to the called telephone if authorized.

12. A method of telecommunication, comprising the steps of:
    automatically ascertaining the personal identity of a caller at a calling telephone during initiation of a call to a called telephone in which the step of automatically ascertaining includes the steps of obtaining fingerprint information from the caller, or obtaining voiceprint information from the caller; and automatically providing the personal identity of the caller as the caller's name to the called telephone prior to the call being answered at the called telephone providing an identity of a telephone of a caller to the called telephone responsive to a determination that the at least one of fingerprint information and voiceprint information is not associated with a known personal.

13. The method of claim 12 in which the step of obtaining fingerprint information includes the step of scanning a fingerprint of a finger of the caller when pressed against one of the keys of a keypad of the calling telephone.

14. The method of claim 13 in which the step of obtaining voiceprint information includes the steps of
converting the voice of the caller to electrical audio signals with a microphone of the calling telephone, and producing corresponding voiceprint information from the caller in response to the electrical audio signals.

15. The method of claim 12 in which the step of ascertaining includes the steps of
transmitting fingerprint information to a fingerprint information database stored in a first telephonic switch, and
transmitting voiceprint information to a digital voiceprint information database stored in a second telephonic switch.

16. The method of claim 15 in which the first telephonic switch and the second telephonic switch are the same switch.

* * * * *